United States Patent [19]

Hattori et al.

[11] 4,057,758
[45] Nov. 8, 1977

[54] MOBILE DIVERSITY RADIO COMMUNICATION SYSTEM

[75] Inventors: Takeshi Hattori; Fumiyuki Adachi, both of Yokohama, Japan

[73] Assignee: Nippon Telegraph and Telephone Public Corporation, Japan

[21] Appl. No.: 618,916

[22] Filed: Oct. 2, 1975

[30] Foreign Application Priority Data

Oct. 21, 1974 Japan .............................. 49-120377

[51] Int. Cl.² .............................................. H04B 7/02
[52] U.S. Cl. ...................... 325/56; 325/154; 325/304; 325/370
[58] Field of Search ................. 325/56, 154, 178, 180, 325/302, 304, 306, 307, 366, 368, 370-372, 376, 377; 343/207, 208, 175-177

[56] References Cited

U.S. PATENT DOCUMENTS

| 3,206,679 | 9/1965 | Miller | 325/302 |
| 3,537,011 | 10/1970 | Escoula | 325/304 |
| 3,693,088 | 9/1972 | Rustako, Jr. et al. | 325/56 |
| 3,821,646 | 6/1974 | Bickford et al. | 325/56 |
| 3,860,872 | 1/1975 | Richardson et al. | 325/304 |

Primary Examiner—Robert L. Griffin
Assistant Examiner—Jin F. Ng
Attorney, Agent, or Firm—Robert E. Burns; Emmanuel J. Lobato; Bruce L. Adams

[57] ABSTRACT

A diversity system in a mobile radio communication system provided with a plurality of antenna systems operating over a multipath medium in at least one of the sending path and the receiving path. At the sending path, a carrier wave frequency- or phase-modulated by a digital baseband signal is transmitted from a transmitting antenna. A plurality of receiving antenna systems are switched at a constant frequency higher than the signaling rate of the digital baseband signal but less than the frequency shift width of the frequency modulated wave or less than a product of the maximum phase shift of the phase modulated wave and the signaling rate, so that average-power dispersion in a signal element of the digital baseband signal received at the receiving antenna systems is effectively compressed. Alternatively, the plurality of antennas may be transmitting antennas, and switched at the same rate to achieve compression of average power dispersion in the baseband signal elements.

18 Claims, 13 Drawing Figures

MOBILE DIVERSITY RADIO COMMUNICATION SYSTEM

FIELD OF THE INVENTION

This invention relates to a diversity system for reducing deterioration of the transmission characteristic of digital signals caused by multipath fading with the use of a plurality of antenna systems in at least one of the sending side or the receiving side.

BRIEF DESCRIPTION OF THE PRIOR ART

There have been heretofore employed a selectively switching system, a maximum value combine system and a same-gain combine system as a diversity system for reducing deterioration of receiving conditions caused by multipath fading. Each of these systems comprises a plurality of receiving systems used for performing diversity reception, so that levels of the respective received signals are detected to select a better receiving system or to combine the respective outputs of the receiving systems so as to obtain an optimum received result. Accordingly, conventional diversity systems have such disadvantages as necessity of the detection of received signal levels, and complicated and uneconomical equipments. Moreover, since the diversity system operates in accordance with a compared result of detected signal levels, the diversity result is frequently lowered at special combinations of the period of multipath fading and the time constant of a diversity switching operation.

On the other hand, one of the most important problems of digital signal transmission in mobile communication is to overcome the above mentioned multipath fading. This multipath fading is usually caused by moving of the receiving point in a combined electric field of multipath transmission waves, which are reflected, scattered and diffracted from structures etc. positioned on the transmission path. In this case, the received wave is generally affected by amplitude fluctuation having a Rayleigh distribution and by phase fluctuation under normal distribution. In case of transmitting a digital signal in such radio communication channel, a sufficiently large carrier to noise ratio is necessary to obtain a desired bit error rate in comparison with a case of no field fluctuation. For example, a margin of 25 decibels will be necessary for the receiving wave level to obtain a bit error rate of $10^{-3}$. It is too expensive to achieve the above margin by increasing the transmitter power or the antenna gain. Accordingly, more effective techniques are required for resolving the above problem. Conventional diversity systems and error correcting systems have been proposed to obtain improvements in the received digital information in compensation for employed equipment becoming more complex. In mobile communication, however, such complicated equipment cannot be adopted in view of the more simple and economical construction of the communication system.

BRIEF SUMMARY OF THE INVENTION

An object of this invention is to provide a diversity system for radio communication over a multipath medium capable of performing stable digital signal transmission unaffected by multipath fading comprising equipment which is simple in comparison with conventional techniques.

Another object of this invention is to provide a diversity system suitable for a mobile radio communication system operating over a multipath medium.

A feature of this invention is to remove a receiving level detector essential for the conventional system and to switch a plurality of antenna systems irrespective of the received wave level.

Another feature of this invention is to use a digital signal as the base band signal, to use angular frequency or phase modulation as the modulation type for transmitting the digital signal, and to select the switching frequency of a plurality of antenna systems to be higher than the signaling rate of the digital signal but less than the frequency shift width of the frequency-modulated wave or less than a product of the maximum phase shift of the phase-modulated wave and the signaling rate, so that average-power dispersion in a signal element of the digital signal received at the receiving side is effectively compressed.

BRIEF DESCRIPTION OF THE DRAWINGS

The principle, construction and operation of this invention will be clearly understood from the following detailed description taken in conjunction with the accompanying drawings, in which.

DETAILED DESCRIPTION OF THE INVENTION

Figure 1:
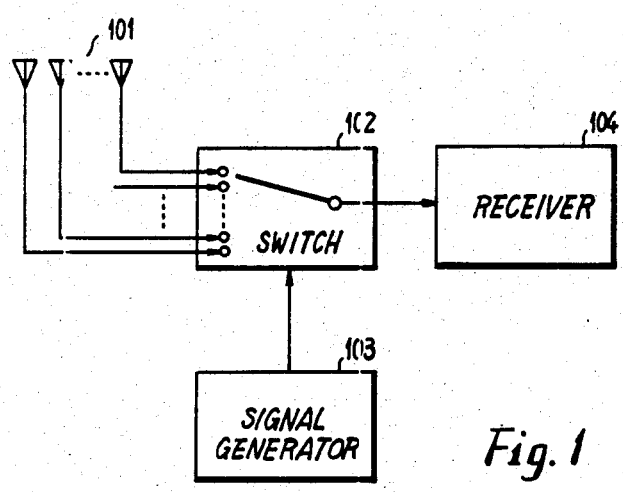
FIG. 1 is a block diagram explanatory of the principle of operation of this invention.

With reference to FIG. 1, an example of this invention comprises a plurality of antennas or antenna systems 101, a switch 102, a signal generator 103 and a receiver 104. In operation, an antenna switching signal is generated from the signal generator 103 in a continuous, random or predetermined manner irrespective of the input of the receiver 104 and employed for switching the antennas 101 at the switch 102. The switch 102 and the signal generator 103 together comprise switching means for switching between ones of the antenna systems 101.

Figure 2:
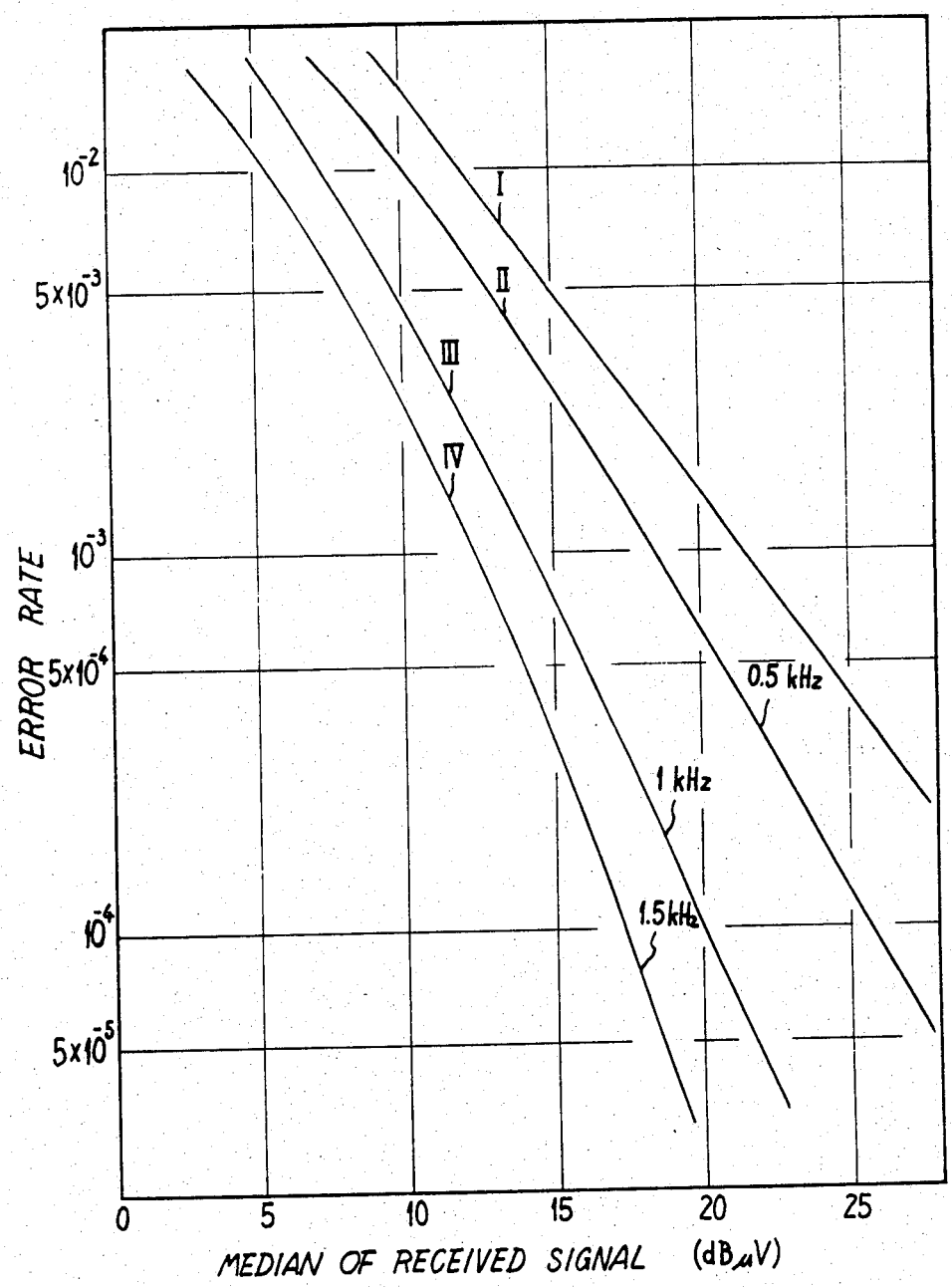
FIG. 2 is a characteristic diagram explanatory of improvements realized by this invention.

In FIG. 2, improved results of the bit error rate of a digital signal received by the above system of this invention of FIG. 1 under Rayleigh fading (i.e. multipath fading) are shown. The abscissa is the median strength of the received signal affected by multipath fading in case of no switching of the antennas 101, while the ordinate is the bit error rate. In this case, two antennas are alternately switched at regular intervals, and switching frequencies are employed as parameters. A curve I corresponds to a case of no switching, and curves II, III and IV correspond respectively to cases of switching frequencies of 0.5 kilo-Hz, 1 kilo-Hz and 1.5 kilo-Hz.

As mentioned above, affection by multipath fading can be effectively reduced by the use of such simplified switching diversity system having no level detector, in digital radio communication.

The switch 102 may be formed into an electrical switching circuit or a mechanical switch. The electrical switching circuit can be formed by the use of PIN diodes.

As mentioned above, since the bit error rate of a digital signal under multipath fading can be improved by switching a plurality of antennas irrespective of the received wave level after removing the level detector, the diversity system can be effectively simplified by the elimination of the level detector.

The above principle of this invention can be applied to the sending side of a radio communication system.

This invention can be effectively applied to a multipath mobile radio communication system operating over a multipath medium to extremely improve signal transmission reliability of a communication channel under multipath fading by the use of a digital signal as the base band signal, by the use of angular modulation as the modulation type for transmitting the digital signal and by the use of a switching frequency of a plurality of antenna systems higher than the signaling rate of the digital signal. In this case, many types of systems can be formed in accordance with this invention. The following descriptions will be given for each type.

Figure 3:
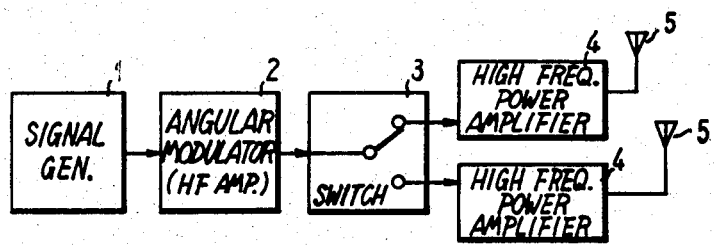
FIGS. 3, 4, 5, 6, 7 and 8 are block diagrams each illustrating an embodiment of this invention.

With reference to FIG. 3, an example of this invention applied to the sending side of mobile radio communication over a multipath medium comprises a signal generator 1, an angular modulator 2 including a high frequency amplifier, a switch 3, high frequency power amplifiers 4, and sending antennas 5. A signal generator for generating a switching signal employed for switching the switch 3 (or 12) is omitted in FIG. 3 (and FIGS. 4, 5, 6, 7 and 8) for simple illustration. As understood from FIG. 3, two sending antenna systems are switched as mentioned above at the input side of the high frequency power amplifiers 4.

Figure 4:
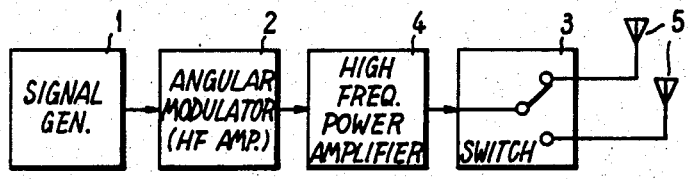

The example shown in FIG. 3 can be modified as shown in FIG. 4, in which two sending antennas 5 are switched as mentioned above.

The number of antenna systems can be increased more than two to further improve the diversity effect.

Figure 6:
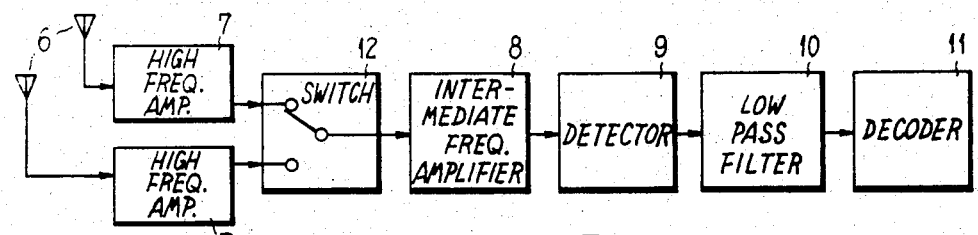

With reference to FIG. 6, an example of this invention applied to the receiving side of mobile radio communication over a multipath medium comprises two receiving antennas 6, two high frequency amplifiers 7, a switch 12, an intermediate frequency amplifier 8, a detector 9, a low-pass filter 10 and a decoder 11. The detector 9 is, for example, a phase detector with integrate and dump functions, or a cascade connection of a limiter and a frequency discriminator. In this example, respective outputs of two receiving antenna systems each comprising the antenna 6 and the high frequency amplifier 7 are switched by the switch 12 as mentioned above.

Figure 7:
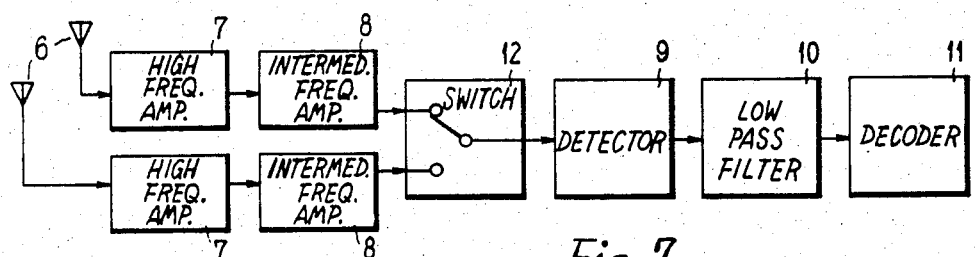
Figure 8:
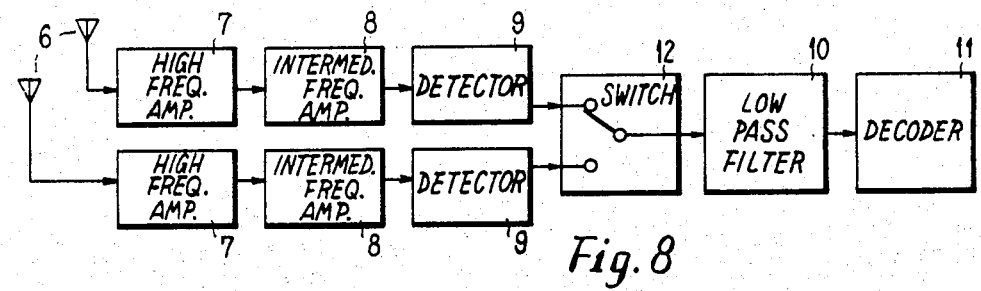

The example shown in FIG. 6 can be modified as shown in FIG. 7 and in FIG. 8. In FIG. 7, outputs of the intermediate frequency amplifiers 8 are switched by the switch 12. In FIG. 8, outputs of the detectors 9 are switched by the switch 12.

In the receiving side, the number of receiving antenna systems shown in FIGS. 6, 7 and 8 can be increased to more than two to further improve the diversity effect.

The diversity effect will be enhanced in each of the sending side and the receiving side by the use of a plurality of antennas having a small mutual correlation therebetween.

In the case of practical application of this invention to radio mobile communication over a multipath medium, the diversity system of this invention is applied to at least one side of the sending side and the receiving side thereof.

In the following, the principle of this invention for obtaining an improved diversity effect will now be described for a case of receiving side diversity. The most remarkable feature obtained by switching the antenna systems is the compression of average-power dispersion of the received signal. In case of signal level decrease due to multipath fading, only a wave of extremely low level can be received by a single antenna. However, if a plurality of antenna systems having small mutual correlation therebetween are employed, it is expectable that one of the antenna systems provides a relatively high received signal level even if the other of the antenna systems provides a low received signal level. Accordingly, since an average power of the outputs of the receiving antenna systems is always obtained by switching the antenna systems, average power dispersion of the received wave can be effectively compressed. An important parameter is not only the average power of the received heat but also the average-power dispersion thereof. An improvement by increasing the average power with the use of two antenna systems is at most 3 decibels. However, in case of digital signal transmission, the error rate can be remarkably improved by the above compression of average-power dispersion, since detection errors of a digital signal are caused when the received wave level decreases below a threshold level of the detector. Accordingly, probability of detection error can be effectively reduced by the above compression of average-power dispersion of the received wave in accordance with this invention.

Figure 9:
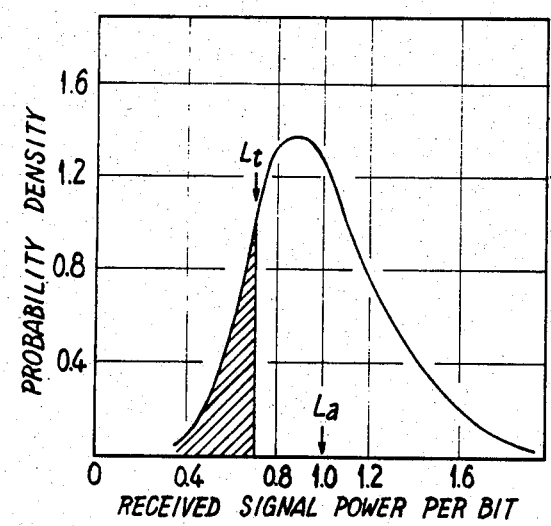
FIGS. 9 and 10 are characteristic diagrams explanatory of improvements realized by this invention.
Figure 10:
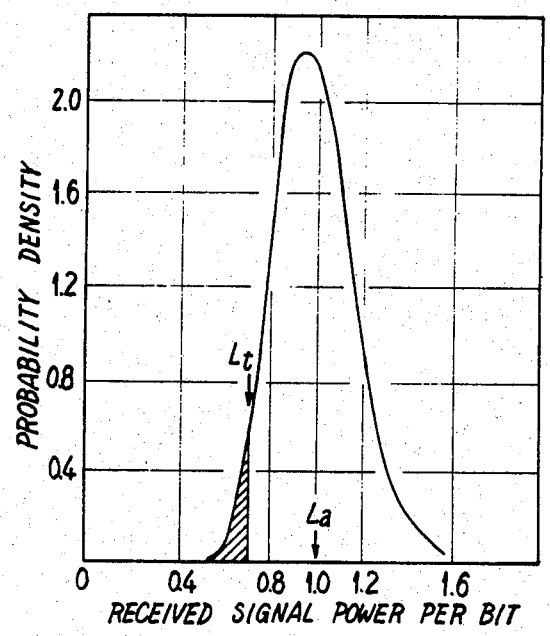

In FIGS. 9 and 10, probability density diagrams of the received signal power per bit according to the narrowband model of a Gauss-Markov process are shown (see: MORTON I. SCHWARTZ, "Distribution of the Time-Average Power of a Gaussian Process," Vol IT-16. No. 1, January 1970, P23 IEEE Transaction, Information Theory). The characteristic shown in FIG. 9 has a larger variance than that in FIG. 10. The error rate in each characteristic corresponds to a sum of probability in a region of the received signal power less than a threshold value $Lt$ as shown by hatching. As understood from the illustrations, a condition having a small variance provides an extremely small error rate in comparison with a case having a larger variance while the two cases have the same average value $La$. If the variance is zero in a rare case, the error rate of zero will be obtained unless the average value $La$ exceeds the threshold value $Lt$.

The principle of this invention for obtaining an improved diversity effect will be understood from the above description. In actual cases, however, real improvements cannot be obtained only by the above principle, since discontinuous phase noise is caused by switching of a plurality of antenna systems because of non-synchronization of carrier waves through the antenna systems, and since modulation distortion is caused because of equivalent fluctuation of the modulation index by the switching. The former discontinuous phase noise can be compressed by selecting the switching speed to be higher than the signaling rate of the base band digital signal, so that the discontinuous phase noise is substantially excluded from the normal bandwidth of the received wave and cut off by the low-pass filter 10 or the detector 9 with the integrate and dump operations. The latter modulation distortion can be reduced by increasing the modulation index of the angular-modulated wave to compensate for the fluctuation of the modulation index.

As mentioned above, reliability of digital signal transmission can be extremely improved in accordance with this invention by suitably selecting the signaling rate of the base band digital signal, the switching frequency of a plurality of antenna systems, the modulation index of the angular-modulated wave, and the cut-off frequency of the low-pass filter in addition to the above mentioned effect of compression of the average-power dispersion. If the switching of a plurality of antenna systems is performed after the detector 9 as shown in FIG. 8, the discontinuous phase noise is not caused while the equipment becomes a little complicated.

In case of switching a plurality of sending antenna systems at the sending side, output waves of the sending antenna systems are successively received at a receiving point. Accordingly, this operation is equivalent to receiving diversity in which a transmitted wave is received by a plurality of receiving antenna systems successively switched, so that the diversity effect is obtained as mentioned above. In case of switching a plurality of sending antenna systems and a plurality of receiving antenna systems, respective outputs of the receiving antenna systems have been already switched by the sending diversity operation. Accordingly, even if each output of the receiving antenna systems is further switched by the receiving diversity operation, the diversity effect is still maintained under a suitable switching frequency at the receiving side.

Figure 5:
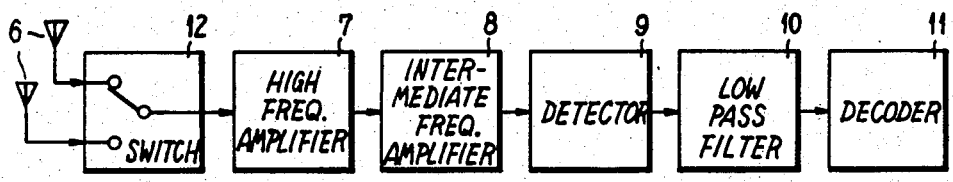
Figure 11:
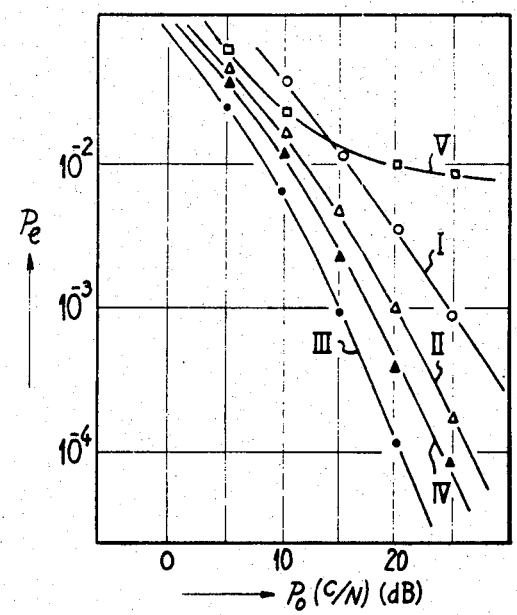
FIGS. 11, 12 and 13 are characteristic diagrams illustrating experimental results obtained for this invention.
Figure 12:
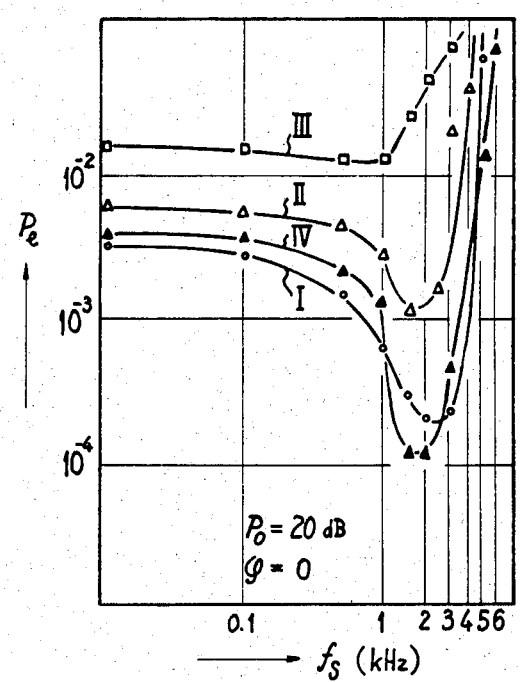

An experimental test of this invention was carried out and the results for obtained the embodiment shown in FIG. 5 are illustrated in FIGS. 11 and 12 similar to the characteristic curves shown in FIG. 2. In this case, the base-band digital signal is a pseudo noise train of a Manchester-Code, the signaling rate is 300 bits/second, the modulation type is frequency shift keying, the frequency shift width is ± 3 kilo-Hz, the carrier frequency is included in the 800 Mega-Hz band, and fading is Rayleigh (multipath) fading of a 40 Hz doppler frequency. At the optimum switching, an improvement of about 10 decibels was obtained at the bit error rate $10^{-3}$ to $10^{-4}$ as understood from FIG. 2. This improvement of 10 decibels is substantially equivalent to that obtained at the optimum diversity condition with level detection of the received wave. The above multipath fading corresponds to a case where a car runs 50 kilometers an hour at the central area of Tokyo.

The upper limit of the switching frequency will be described in view of experimental results. In FIG. 11, characteristics of error rates $Pe$ on the average value $Po$ of the received carrier to noise ratio C/N with parameters of switching frequency $f_s$ under a frequency shift width $\Delta f_d$ of 6 kilo-Hz are illustrated. Curves I, II, III, IV and V correspond respectively to no diversity, 1 kilo-Hz, 2 kilo-Hz, 3-kilo-Hz and 4 kilo-Hz of the switching frequency $f_r$. At the optimum switching frequency of 2 kilo-Hz, an improvement of about 10 decibels is obtained for an error rate of $10^{-3}$ as shown by the characteristic curve III, while the error rate abruptly increases when the switching frequency $f_s$ exceeds the optimum switching frequency.

In FIG. 12, characteristics of error rates $Pe$ on the switching frequency $f_s$ with parameters of frequency shift width for the average value $Po$ of 20 decibels of the received carrier to noise ratio C/N are shown. As understood from FIG. 12, it is necessary that the switching frequency $f_s$ be less than the frequency shift width $\Delta f_d$ of 6 kilo-Hz. If a phase-modulated wave is transmitted through a radio communication system over a multipath medium to which the diversity system of this invention is applied, the switching frequency $f_s$ must be less than a product of the maximum phase shift value and the signaling rate of the digital base-band signal. The optimum switching frequency is about 2 kilo-Hz irrespective of the frequency shift width. The range of the switching frequency for which the diversity effect can be obtained is about 2 kilo-Hz. The diversity effect increases as the frequency shift width is enlarged but saturates at the bandwidth of the intermediate frequency stage at the receiving side.

Figure 13:
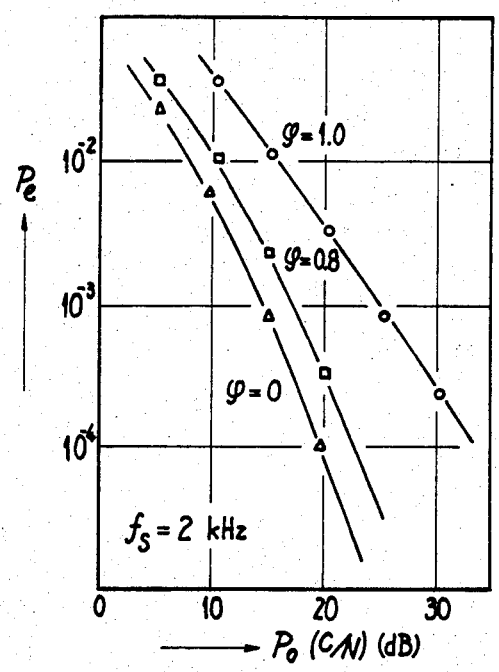

The coefficient of correlation between outputs of two antenna systems varies in accordance with a distance between the two antennas. In case of a very short distance between the two antennas in comparison with the wavelength of the employed carrier wave, outputs of the two antenna systems include fading with a high coefficient of correlation. However, if the distance between the two antennas exceeds one half the wave length of the employed carrier wave, outputs of the two antenna systems are effected with independent fading so that they have substantially no correlation. As illustrated in FIG. 13, since the lowering of improvement is about 2 decibels in case of the coefficient of correlation $\phi$ of 0.8, a relatively short distance between the two antennas may be actually adopted.

As mentioned above, the following merits are obtained in accordance with this invention, in addition to extreme compression of the error rate in digital signal transmission. In case of switching at the antenna stage in the sending side or the receiving side, the diversity system can be extremely simplified. If the diversity switching is performed at the high frequency stage, a high voltage proof characteristic is not necessary at the switch. At a receiving side, when the diversity switching is carrier out at a stage arranged after the high frequency stage, lowering of the receiving sensitivity is avoidable. In case of frequency modulation communication, if the diversity switching is performed after the detector stage, impulsive noise is effectively avoidable. Moreover, the characteristic of the digital transmission error is changed from a burst state to a random state by the application of this invention, so that error correcting techniques can be readily and economically introduced with a remarkable improvement. This invention may be also realized in combination with other diversity systems and applied to a high class receiver having a feedback loop to obtain a further improved diversity result.

What we claim is:

1. In a mobile diversity radio communication system, for operating over a multipath medium, of the type including a base station and at least one mobile station, wherein at least one of said stations comprises transmitting means for transmitting radio signals to another station of the system, wherein at least the other station comprises receiving means for receiving radio signals from said transmitting means, an antenna system for radiating the radio signals being transmitted and an antenna system for receiving said radio signals, and wherein at least one of said stations includes a plurality of antenna systems for operating in a space diversity mode, the improvement which comprises:

said transmitting means comprising modulation means for frequency shift modulating the radio signals being transmitted by a digital baseband signal; and switching means connected to said plurality of antenna systems operable for switching between ones of said antenna systems to render ones of said antenna systems active at a constant rate which rate is higher than the signaling rate of the digital baseband signal but less than the frequency shift width of the frequency shift modulated radio signal, being transmitted thereby to compress average-power dispersion in a signal element of the digital baseband signal.

2. In a mobile diversity radio communication system according to claim 1, wherein said receiving means comprises a filter for filtering noise in the radio signals caused by switching between ones of said plurality of antenna systems at said constant rate.

3. In a mobile diversity radio communication system according to claim 1, wherein each of said receiving means comprises an integrate and dump detector for performing an integrate and dump operation for each signal element of the digital baseband signal for suppressing noise in the radio signals caused by switching between ones of said plurality of antenna systems at said constant rate.

4. In a mobile diversity radio communication system according to claim 1, wherein said plurality of antenna systems are transmitting antennas, and wherein said switching means comprises means for successively connecting ones of said plurality of antennas at said constant rate to the transmitting means of said at least one station for successively transmitting radio signals from the successive ones of said antennas at said constant rate.

5. In a mobile diversity radio communication system according to claim 4, wherein the transmitting means of said at least one station having a plurality of antennas includes a frequency shift modulator, and a power output amplifier connected with the modulator for developing frequency shift modulated radio signals, and said switching means comprises means for successively connecting successive ones of said antennas at said constant rate to said power output amplifier.

6. In a mobile diversity radio communication system according to claim 4, wherein the transmitting means of said at least one station having a plurality of antennas comprises a frequency shift modulator, and a plurality of power output amplifiers each connected to a respective one of said antennas, and said switching means comprises means for successively connecting said frequency-modulator at said constant rate to successive ones of said power output amplifiers for successively frequency shift modulating radio signals developed by respective ones of said power output amplifiers, thereby to successively transmit frequency shift modulated radio signals from successive ones of said antennas.

7. In a mobile diversity radio communication system according to claim 1, wherein said plurality of antenna systems are receiving antennas, and said switching means comprises means for successively connecting the receiving means with successive ones of said antenna systems at said constant rate.

8. In a mobile diversity radio communication system according to claim 7, further comprising a plurality of radio signal amplifiers each connected to a respective one of said antenna systems, and wherein said receiving means comprises a detector for detecting the received frequency shift modulated radio signals, and wherein said switching means comprises means for successively connecting respective ones of said radio signal amplifiers to said detector at said constant rate for successive detection of the received radio signals received by respective ones of said antenna systems.

9. In a mobile diversity radio communication system according to claim 7, wherein said receiving means of said station including said plurality of antennas includes a plurality of detectors each connected to a respective one of said radio signal amplifiers for detecting the respective frequency shift modulated radio signals received by said antenna systems, and a filter for filtering outputs of said detectors, and wherein said switching means comprises means for successively connecting at said constant rate successive ones of said detectors to said filter.

10. In a mobile diversity radio communication system, for operating over a multipath medium, of the type including a base station and at least one mobile station, wherein at least one of said stations comprises transmitting means for transmitting radio signals to another station of the system, wherein at least the other station comprises receiving means for receiving radio signals from said transmitting means, an antenna system for radiating the radio signals being transmitted and an antenna system for receiving said radio signals, and wherein at least one of said stations includes a plurality of antenna systems for operating in a space diversity mode, the improvement which comprises:

said transmitting means comprising modulation means for phase modulating the radio signals being transmitted by a digital baseband signal; and switching means connected to said plurality of antenna systems and operable for switching between ones of said antenna systems to render ones of said antenna systems active at a constant rate which rate is higher than the signaling rate of the digital baseband signal but less than a product of the maximum phase shift of the phase-modulated radio signal and the signaling rate of the digital baseband signal, thereby to compress average-power dispersion in a signal element of the digital baseband signal.

11. In a mobile diversity radio communication system according to claim 10, wherein each of said receiving means comprises a filter for filtering noise in the radio signals caused by switching between ones of said plurality of antenna system at said constant rate.

12. In a mobile diversity radio communication system according to claim 10, wherein each of said receiving means comprises an integrate and dump detector for performing an integrate and dump operation for each signal element of the digital baseband signal for suppressing noise in the radio signals caused by switching between ones of said plurality of antenna systems at said constant rate.

13. In a mobile diversity radio communication system according to claim 10, wherein said plurality of antenna systems are transmitting antennas, and wherein said switching means comprises means for successively connecting ones of said plurality of antennas systems at said constant rate to the transmitting means of said at least one station for successively transmitting radio signals from the successive ones of said antennas systems at said constant rate.

14. In a mobile diversity radio communication system according to claim 13, wherein the transmitting means of said at least one station having a plurality of antennas includes a phase-modulator, and a power output amplifier connected with the modulator for developing phase modulated radio signals modulated by said modulator, and said switching means comprises means for successively connecting successive ones of said antennas at said constant rate to said power output amplifier.

15. In a mobile diversity radio communication system according to claim 13, wherein the transmitting means of said at least one station having a plurality of antennas comprises a phase-modulator, and a plurality of power output amplifiers each connected to a respective one of said antennas, and said switching means comprises means for successively connecting said phase-modulator at said constant rate to successive ones of said power output amplifiers for successively modulating radio signals developed by respective ones of said power output amplifiers, thereby to successively transmit phase-modulated radio signals from successive ones of said antennas.

16. In a mobile diversity radio communication system according to claim 10, wherein said plurality of antenna systems are receiving antennas, and said switching means comprises means for successively connecting the receiving means with successive ones of said antenna systems at said constant rate.

17. In a mobile diversity radio communication system according to claim 16, further comprising a plurality of radio signal amplifiers each connected to a respective one of said antenna systems, and wherein said receiving means comprises a detector for detecting the received phase-modulated radio signals, and wherein said switching means comprises means for successively connecting respective ones of said radio signal amplifiers to said detector at said constant rate for successive detection of the received radio signals received by respective ones of said antenna systems.

18. In a mobile diversity radio communication system according to claim 16, wherein said receiving means of said station including said plurality of antenna systems includes a plurality of detectors each connected to a respective one of said radio signal amplifiers for detecting the respective phase-modulated radio signals received by said antenna systems, and a filter for filtering outputs of said detectors, and wherein said switching means comprises means for successively connecting at said constant rate successive ones of said detectors to said filter.

* * * * *